Aug. 17, 1948.　　　G. G. WIDEN ET AL　　　2,447,445
GEAR TESTER
Filed March 9, 1944　　　6 Sheets-Sheet 3
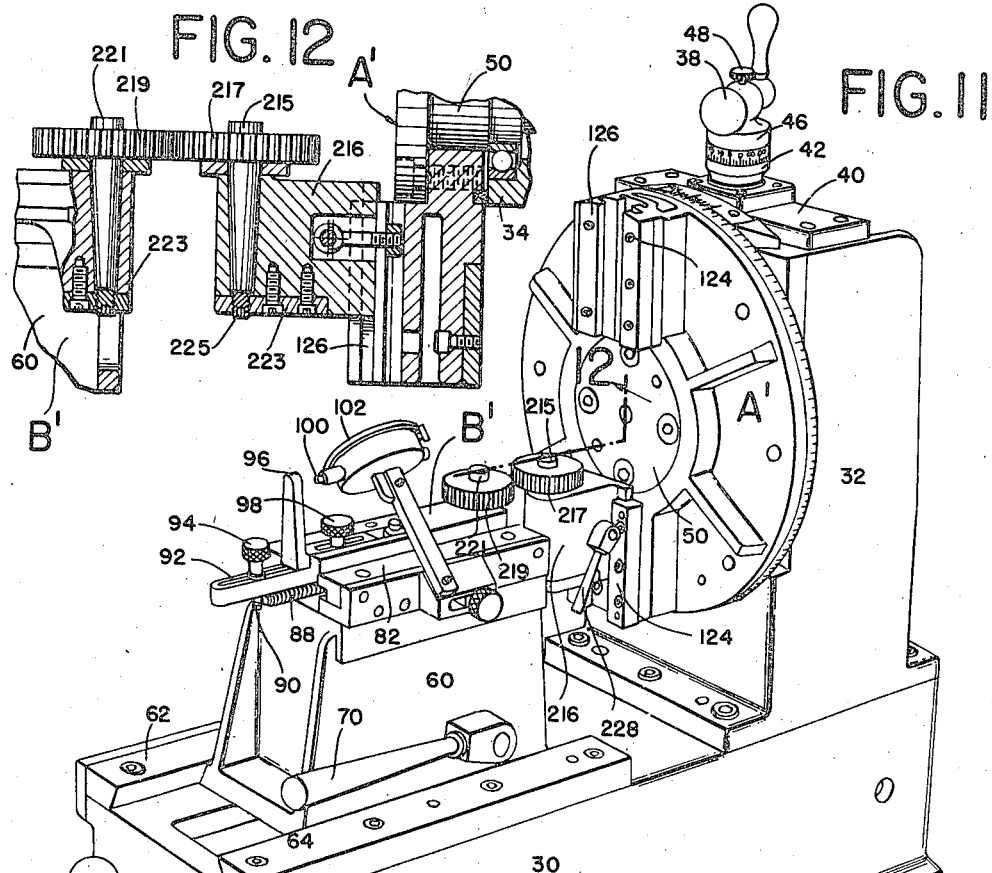
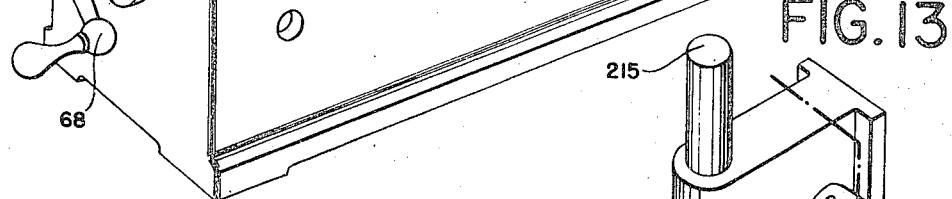
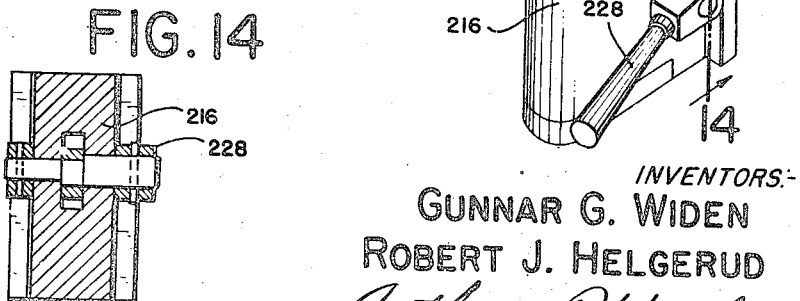
INVENTORS:-
GUNNAR G. WIDEN
ROBERT J. HELGERUD
BY Arthur R. Wylie
ATTY.

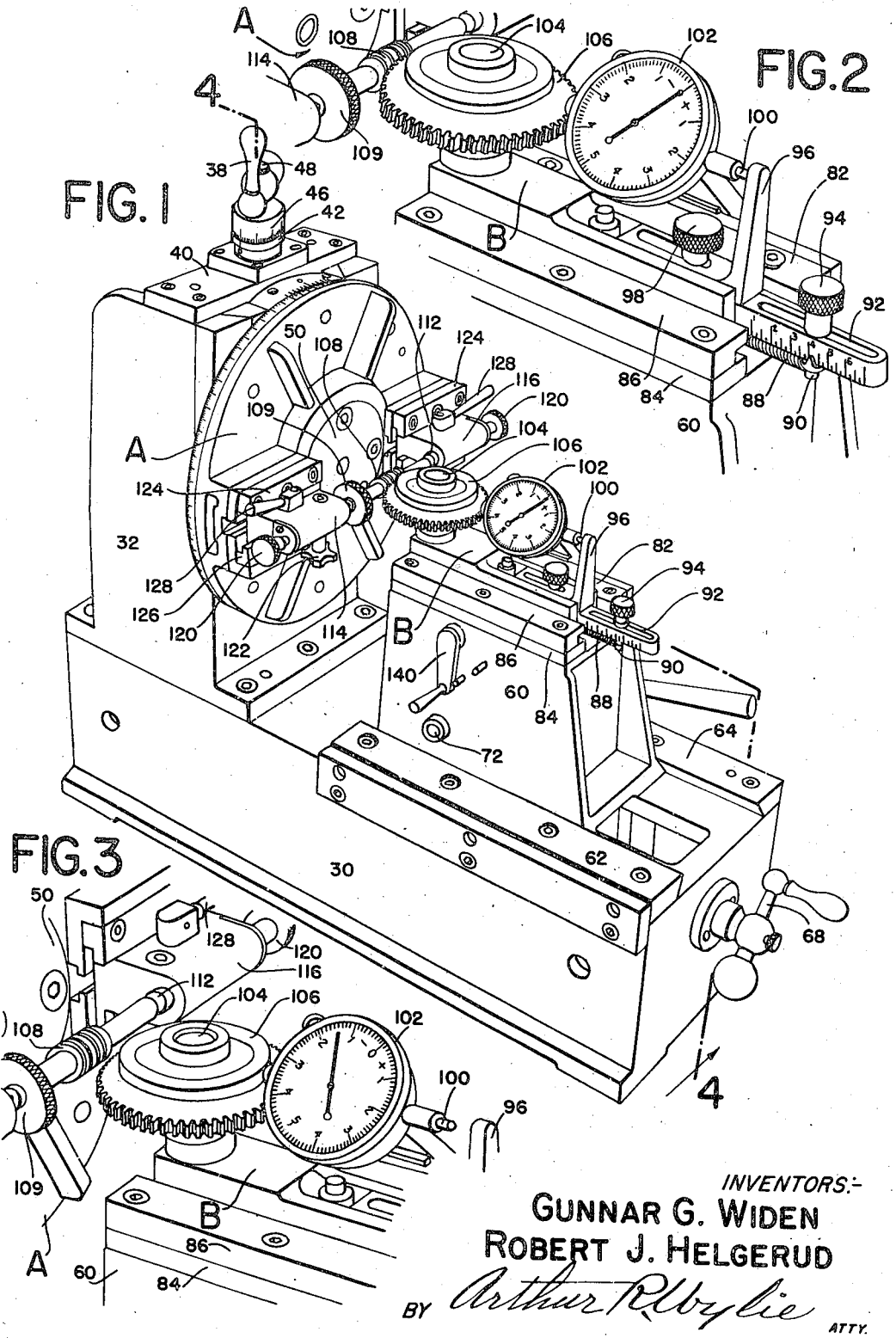

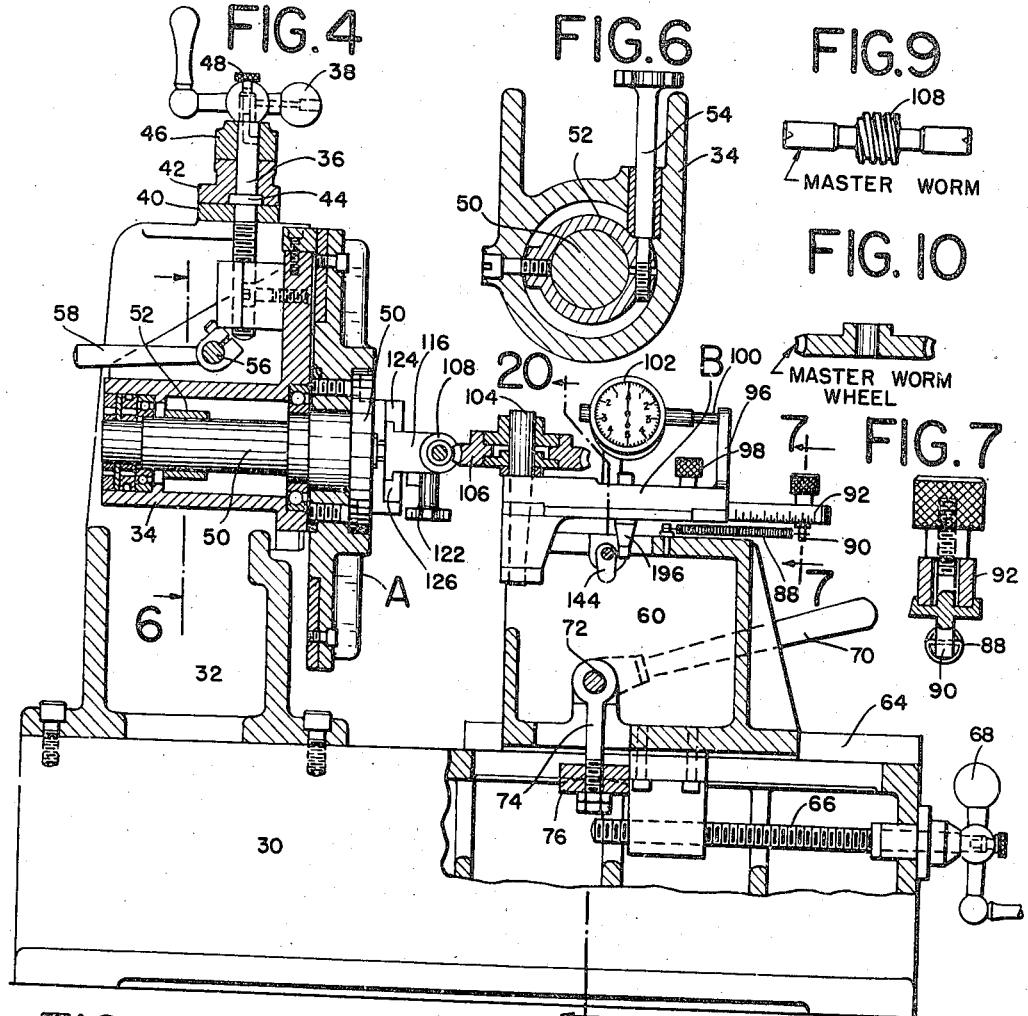
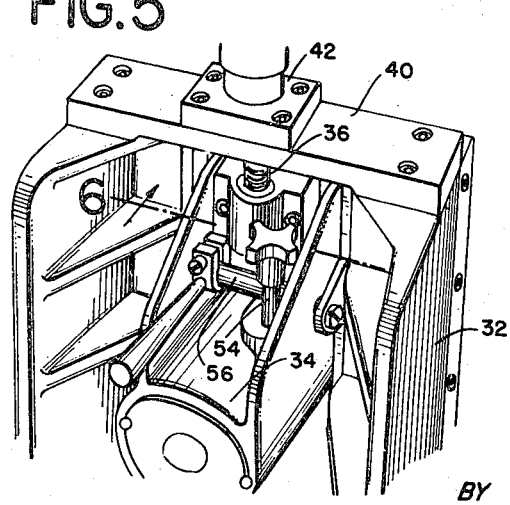
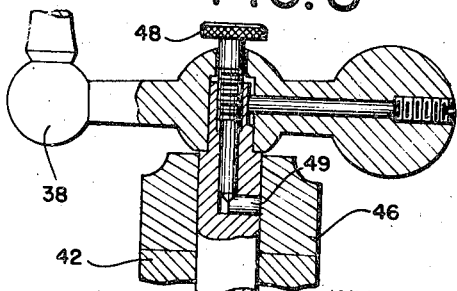

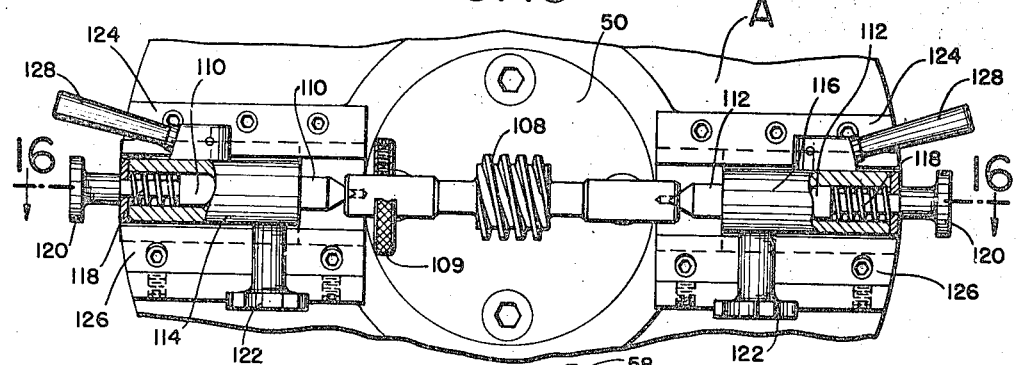

Aug. 17, 1948.   G. G. WIDEN ET AL   2,447,445
GEAR TESTER
Filed March 9, 1944   6 Sheets—Sheet 5
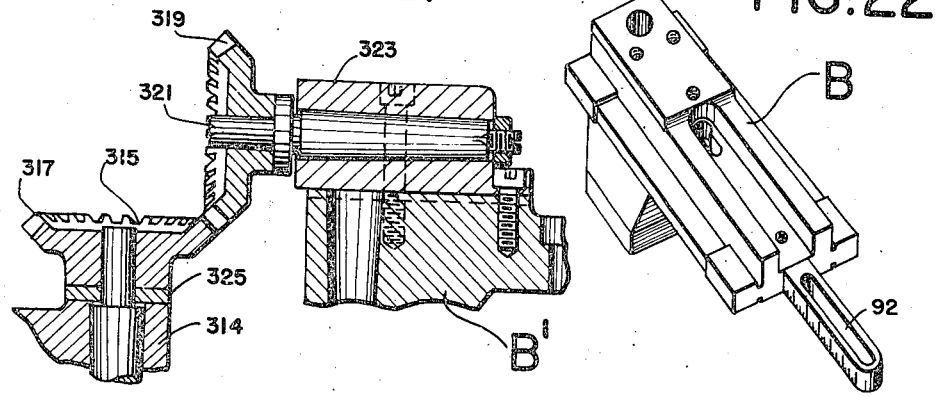
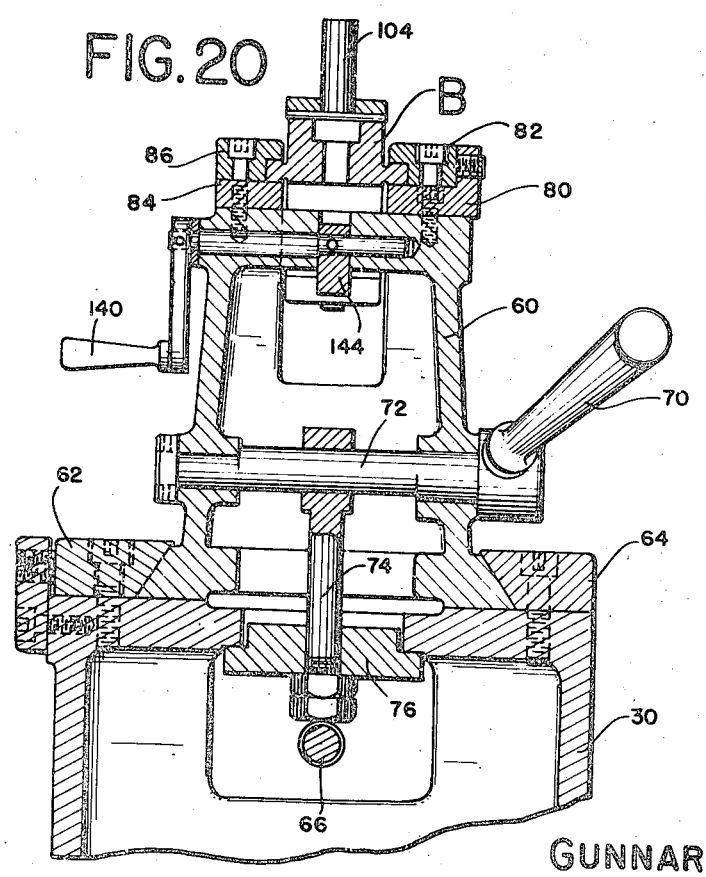
INVENTORS:-
GUNNAR G. WIDEN
ROBERT J. HELGERUD
BY Arthur R. Wylie
ATTY

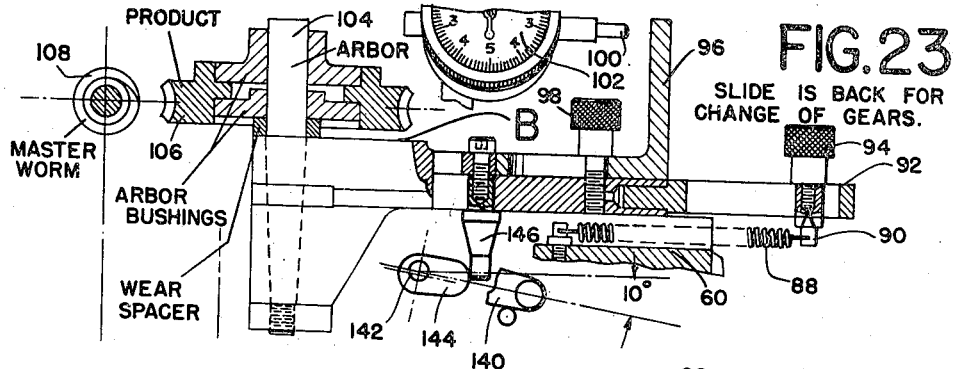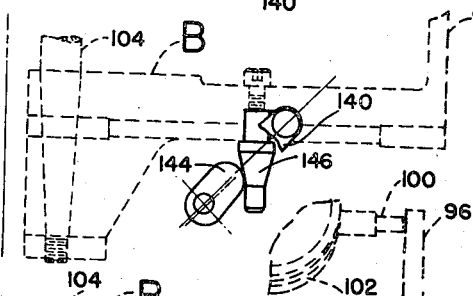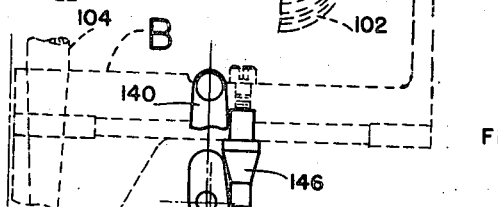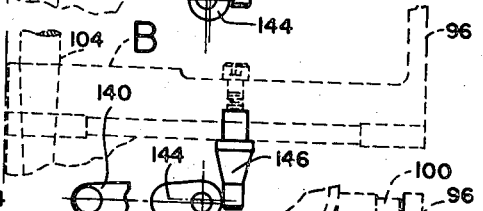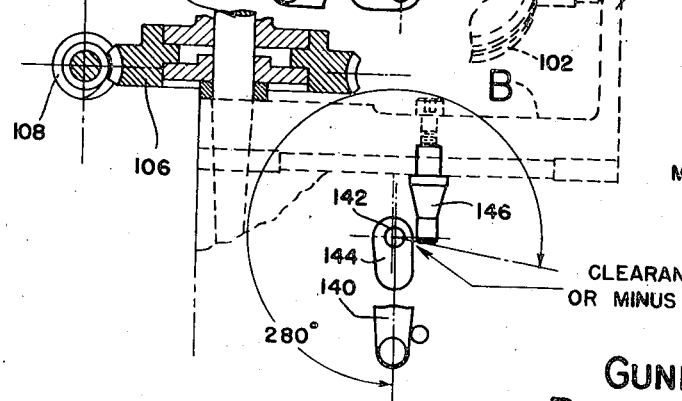

Patented Aug. 17, 1948

2,447,445

UNITED STATES PATENT OFFICE 2,447,445

GEAR TESTER

Gunnar G. Widen and Robert J. Helgerud, Minneapolis, Minn., assignors to General Mills, Inc., a corporation of Delaware Application March 9, 1944, Serial No. 525,742

3 Claims. (Cl. 33—179.5)

This invention relates to gear testers.

An object of the invention is the provision of simple, rapid, accurate and efficient means for testing the accuracy of gears of various kinds.

This and other objects as will hereinafter appear are accomplished by this invention which is fully described in the following specification and shown in the accompanying drawings in which Figure 1 is a perspective view of one form of the gear tester for use in testing the accuracy of worms and worm wheels;

Fig. 2 is a partial enlarged view similar to Fig. 1;

Fig. 3 is a similar view showing the worm wheel out of mesh with the worm;

Fig. 4 is a longitudinal vertical section through Fig. 1;

Fig. 5 is a partial enlarged perspective view from the rear of the head-stock of Fig. 1;

Fig. 6 is a partial vertical section on the line 6 of Figs. 4 and 5;

Fig. 7 is an enlarged section on the line 7—7 of Fig. 4;

Fig. 8 is an enlarged partial vertical section on the crank at the top of Fig. 4;

Fig. 9 is a side elevation of a standard worm for testing worm wheels;

Fig. 10 is a longitudinal section of a worm wheel for testing worms;

Fig. 11 is similar to Fig. 1, but viewed from the opposite side and showing the machine rigged for testing spur gears;

Fig. 12 is a partial enlarged vertical section on the line 12 of Fig. 11;

Fig. 13 is an enlarged perspective of the adapter used in the rotatable head as shown in Fig. 11;

Fig. 14 is a section on the line 14 of Fig. 13;

Fig. 15 is a partial enlarged front elevation of a rotatable plate of Fig. 1 showing some of the parts in section;

Fig. 16 is a partial horizontal section taken on the line 16—16 of Fig. 15;

Figs. 17 and 18 are transverse sections on the lines 17 and 18 of Fig. 16;

Fig. 19 is a view similar to Fig. 9 showing a special jig for testing worms;

Fig. 20 is a partial enlarged vertical section on the line 20—20 of Fig. 4;

Fig. 21 is a partial enlarged section similar to Fig. 12 but showing the jigs rigged up for testing bevel gears ;

Fig. 21A is a perspective of an adapter block for a jig of Fig. 21;

Fig. 22 is an enlarged perspective of a carriage of Fig. 1;

Fig. 23 is a partial vertical section through the carriage showing the latter backed away and the worm wheel out of mesh with the worm; and Figs. 24 to 27, inclusive, are similar views showing diagrammatically the several steps of bringing the gears gradually into mesh.

The embodiment illustrated comprises a gear tester having a base 30 in which is mounted a plate A rotatable about a horizontal axis and a carriage or slide B slidable horizontally axially of the plate. Means are provided, as will later be explained, for mounting one gear to be tested on the plate and the meshing gear on the carriage, as well as means for accurately measuring the "runout" or inaccuracies of the gears as they are rotated about fixed axes. Usually, a gear to be tested is measured when meshed with a master gear of known accuracy. Thus the readings obtained show the accuracy of the gear to be tested. Various types of gears, such as worm and worm wheel, spur gears, bevel gears, etc., can be tested in pairs with this gear tester.

On the base is bolted a head casting 32 (Fig. 4) in which is slidably mounted a shaft housing 34 which slides vertically in guideways 35, 35 (Fig. 16) in the head-stock and which is moved up and down by means of a screw 36 and a crank 38. The screw is journalled in members 40, 42 and has a shoulder 44 preventing longitudinal movement. A collar 46 (Fig. 8) is graduated and is made adjustable by means of a screw 48 and a wedge pin 49. A shaft 50 (Fig. 4) carrying the plate A is journalled in suitable ballbearings in the housing 34 so as to rotate about a horizontal axis and is surrounded by a brake band 52 which has a screw 54 (Fig. 6) for locking the band on the shaft so that the shaft can be locked in any adjusted position. An eccentric shaft 56 and lever 58 (Fig. 16) also serve to lock the housing 34 in any adjusted position vertically. Various jigs for holding gears to be tested on the plate A will later be described.

A tail-stock 60 (Figs. 4 and 20) is mounted on the base and is slidable thereon between guides 62, 64 axially of the shaft 50. It is movable by means of a screw 66 and a crank 68 and may be locked in adjusted position by means of a lever 70 keyed on an eccentric shaft 72 journalled in the tail-stock and carrying a link 74 passing through a brake shoe 76 slidable with the tail-stock in the base.

The carriage B is slidable back and forth in the tail-stock between carefully ground and adjusted guides 80, 82 on one side and 84, 86 on the other. This carriage is urged to the left in Fig.

4 by means of a spring 88, one end of which is secured to the lower end of an adjustable bolt 90 which passes up through a slotted bar 92 on the carriage, the screw being secured at any adjusted position by means of a knurled nut 94 to adjust the tension of the spring 88. A vertical finger on stop 96 is adjustably secured to the carriage or slide by means of a knurled nut 98. This finger is adapted to engage a contact pin 100 of a dial gauge 102. This dial gauge is adapted to read movements of the contact pin to one ten-thousandths of an inch. The purpose of this will presently be apparent.

A short vertical stub axle or arbor 104 is carried by the carriage, the axis of which is at right angles to the axis of the worm 108. On this axle is rotatably mounted a worm wheel 106 to be tested. The corresponding worm 108 (Fig. 16) is mounted for rotation on conical centers 110, 112 which are slidably mounted in alignment in blocks 114, 116 and are urged toward each other by means of springs 118 and the operator may rotate them or adjust them by means of knobs 120 and when adjusted they are locked by means of screws 122 (Fig. 17). The blocks 114, 116 are slidably mounted between guides 124, 126 and these blocks may each be locked in place by means of a locking lever 128 on an eccentric shaft 130 operating a link 132 on a brake shoe 134. The plate A is graduated on its periphery and provided with a vernier at the top so that it can be set accurately at any position, particularly with the centers 110, 112 horizontal or vertical.

Thus it will be understood that where worm wheels 106 are to be tested they will be mounted on the stub axle 104 as shown in Fig. 3 and that the corresponding worm 108 is a standard worm which has been accurately ground and measured so that by rotating the two in mesh, the worm wheel can be tested. When the worm wheel is moved into mesh with this standard worm, this is done by means of a crank 140 which normally stands in the position shown in Fig. 23 in which the carriage is retracted so as to hold the gears out of mesh. This crank is keyed on a shaft 142 which carries a cam 144 which bears against a block 146 depending from the carriage B. As the crank 140 is slowly rotated in a counterclockwise direction, as shown in Figs. 24 to 27, the carriage moves to the left first at a fairly rapid pace and then more slowly as the lower portion of the cam 144 comes in contact with the block 146. The carriage is so adjusted that when the worm 106 is in mesh with the worm wheel 108 (Fig. 27) the cam 144 is out of contact with the block 146. In fact, the clearance between the cam and block at this point must be great enough that no amount of inaccuracy or "runout" in the worm will permit them to come in contact as the worm and worm wheel are rotated while held yieldably in mesh by the spring 88.

The method of operation of this form of the device is as follows. A standard worm as 108 is carefully ground and calibrated so that its irregularities, if any, are known. This worm is then placed between centers 112 which are then set accurately in a horizontal position by means of the graduations on the periphery of plate A. A hand wheel 109 is secured thereon for turning the worm. The centers are then clamped by means of the screws 122 so as to eliminate errors due to variation in distances between these centers. A worm wheel 106 to be tested is placed on the axle 104 and the carriage so adjusted that the worm wheel will stand away from the worm, as shown in Fig. 23, when the carriage or slide is drawn back and so that the block 146 will be out of contact with the cam 144 when the gears are fully in mesh as shown in Fig. 27. The pressure exerted at this time will depend upon the tension of the spring 88 which may be adjusted to suit the conditions of the test as is shown by experience.

At this time the finger 96 has pressed in the contact pin 100 of the dial gauge 102. The dial gauge can then be adjusted to zero, as shown in Fig. 2, by rotating the face of the dial in a manner well known with this type of instrument. The operator then turns the worm 108 by means of the hand wheel 109, thereby rotating both the worm and the worm wheel. At the same time he observes the readings of the dial indicator to see whether the pointer shows either plus or minus variations and how much. He keeps rotating the worm wheel until the worm wheel has made a complete revolution and if the variations noted are less than the allowable variations for that particular worm wheel, it will be passed as satisfactory.

Referring to Figs. 23 to 27, inclusive, it will be noted that the cam 144 first moves the carriage or slide rapidly toward the master worm 108 and then more slowly so that when the two come into mesh the motion of the worm wheel is very slow. This permits a rapid motion of the crank 140 by the operator with no appreciable damage to the worm, worm wheel and indicator, the latter in particular being susceptible to injury by a shock or blow.

The crank 140 in Fig. 23 holds the carriage back with the spring 88 in tension. In Fig. 27 the cam 144 is out of contact with the block 146 and the spring 88 holds the worm against the worm wheel.

Fig. 19 shows a modification of the worm where the worm itself is to be tested for accuracy against a standard or master worm wheel. In this case the worm 208 is mounted on a special arbor 211, one end of which is screw-threaded to receive a locking nut 213. A hand wheel 209 serves as before to rotate the worm. The ends of the arbor are drilled to receive the conical centers 110, 112, as before.

Reading the helix angle of the worm is done by turning the plate A in one direction until the worm in engagement with a standard worm wheel will turn no further and reading the peripheral scale in degrees, then turning the plate A in the opposite direction as far as it will go and again reading its angle. From the average of these two readings the helix angle can be calculated.

The operation of testing the accuracy of this worm is quite similar to that previously described for testing the worm wheel.

In Figs. 11 through 14 is shown a modified form of the device for use in testing spur gears. In this a block 216 is slidably mounted in radial guides in the plate A in substantially the same way as previously described for the block 116 and is locked by a lever 228 corresponding to the lever 128 of Fig. 18. This block carries an arbor 215 which is adapted to accurately fit the bore in a gear 217. A corresponding mating gear 219 is similarly mounted on an arbor 221 in the carriage B' which is otherwise substantially the same as the carriage B of Fig. 4. The plate A' is then turned to a position 90° from that shown in Fig. 4 so that the axes of the arbors 215 and 221 are parallel.

The arbor 215 is preferably tapered and placed into a tapered hole in the adapter 216. To keep this hole clean and to provide for removing this axle we have secured a plate 223 to the adapter by screws and a screw 225 is threaded through the plate in axial alignment with the stub axle 215 for removing it. The same is true of the stub axle 221.

The testing of the gears 217, 219, one of which is a master gear while the other is the product to be tested, proceeds in much the same way as previously described for the worm and the worm wheel except that in this case the operator turns the gear 217 by hand, at the same time noting the plus and minus readings of the dial indicator.

In Fig. 21 is shown still another modification of the gear tester with adapters arranged for testing bevel gears. Here again, either gear 317 or 319 may be the master gear while the other is the gear to be tested. The adapter 323 secured to the carriage B' by screws thus carries a stub axle 321 which is horizontal and parallel to the axis of the plate A and adapted to receive the gear 319. The block 314 corresponds to the block 114 of Fig. 16 and carries a stub axle 315 for the gear 317. The plate A is then turned so as to place the axis of the axle 315 vertical and at right angles to the arbor 321. A wear spacer 325 is used to reduce wear on the gear 317.

The method of testing these bevel gears is substantially the same as that described for the spur gears. Should the axis of the worm and the worm wheel not be 90° as shown in Fig. 1, the plate A can be turned to any angle assumed by the axis of the worm with respect to the axis of the worm wheel.

Thus it will be seen that we have provided a very simple, rapid, accurate and efficient means for testing gears of various kinds and one which can be varied in numerous ways to adapt itself to different combinations of gears.

While we have shown and described but a few embodiments of our invention, it is to be understood that it is capable of many modifications. Changes, therefore, may be made which do not depart from the spirit and scope of our invention as disclosed in the appended claims.

We claim as our invention:

1. Gear testing apparatus comprising a main frame, a plate rotatable about an axis in the main frame, means on the plate for rotatably mounting a gear for rotation at right angles to the axis of the plate, a carriage slidable axially toward and from the plate, a spring for urging the carriage toward the plate, cam means opposing the spring for moving the carriage, the angle of the cam being less steep as the gears approach each other, means on the carriage for mounting a gear for meshing with the first-mentioned gear, and means for measuring movements of the carriage as the gears are rotated.

2. Gear testing apparatus comprising a main frame, a plate rotatable about an axis in the main frame, means on the plate for rotatably mounting a gear for rotation at right angles to the axis of the plate, a carriage slidable axially toward and from the plate, a spring for urging the carriage toward the plate, cam means opposing the spring for moving the carriage, the angle of the cam being less steep as the gears approach each other, means on the carriage for mounting a gear for meshing with the first-mentioned gear, a dial indicator carried by the main frame and having a contact point, and a finger on the carriage adapted to engage the contact point to indicate movements of the carriage due to runout of the gears.

3. Gear testing apparatus comprising a main frame, a plate rotatable about an axis in the main frame, means on the plate for rotatably mounting a gear for rotation at right angles to the axis of the plate, a carriage slidable axially toward and from the plate, a spring for urging the carriage toward the plate, cam means opposing the spring for moving the carriage, the angle of the cam being less steep as the gears approach each other, means on the carriage for mounting a gear for meshing with the first-mentioned gear, a dial indicator carried by the main frame and having a contact point, a finger on the carriage adapted to engage the contact point to indicate movements of the carriage due to runout of the gears, the cam being mounted on a horizontal shaft, and a crank so mounted on said shaft that the crank hangs substantially vertically when the cam is engaged and moves through an angle of about 280° to a point below horizontal when the cam is withdrawn.

GUNNAR G. WIDEN.
ROBERT J. HELGERUD.

REFERENCES CITED

The following references are of record in the file of this patent:

UNITED STATES PATENTS

| Number | Name | Date |
|---|---|---|
| 1,222,392 | Green et al | Apr. 10, 1917 |
| 1,363,799 | Logue | Dec. 28, 1920 |
| 1,547,514 | Mueller | July 28, 1925 |
| 1,554,646 | Olson | Sept. 22, 1925 |
| 1,625,462 | Frauenthal | Apr. 19, 1927 |
| 2,326,368 | Kullman | Aug. 10, 1943 |

FOREIGN PATENTS

| Number | Country | Date |
|---|---|---|
| 460,008 | Great Britain | 1937 |